L. F. NIELSEN.
TRACTOR.
APPLICATION FILED MAY 26, 1919.

1,384,968.

Patented July 19, 1921.
2 SHEETS—SHEET 1.

Inventor:
Lauritz F. Nielsen.
By Whiteley and Ruckman
his Attorneys.

L. F. NIELSEN.
TRACTOR.
APPLICATION FILED MAY 26, 1919.

1,384,968.

Patented July 19, 1921.
2 SHEETS—SHEET 2.

Inventor:
Lauritz F. Nielsen
By Whiteley and Ruckman
his Attorneys.

UNITED STATES PATENT OFFICE.

LAURITZ F. NIELSEN, OF MINNEAPOLIS, MINNESOTA, ASSIGNOR TO THE ALLIED TRACTORS COMPANY, OF MINNEAPOLIS, MINNESOTA, A CORPORATION.

TRACTOR.

1,384,968.  Specification of Letters Patent.  Patented July 19, 1921.

Application filed May 26, 1919. Serial No. 299,692.

*To all whom it may concern:*

Be it known that I, LAURITZ F. NIELSEN, a citizen of the United States, residing at Minneapolis, in the county of Hennepin and State of Minnesota, have invented certain new and useful Improvements in Tractors, of which the following is a specification.

My invention relates to tractors and particularly to tractors having two large driving wheels at the front and two smaller steering wheels at the rear. An object is to so construct the driving wheels and the mechanism associated therewith that shocks and strains incident to starting the tractor and shifting the gears will be eliminated.

The full objects and advantages of my invention will appear in connection with the detailed description thereof and the novel features embodied in my inventive idea will be particularly pointed out in the claims.

Referring to the accompanying drawings,—

Figure 1:
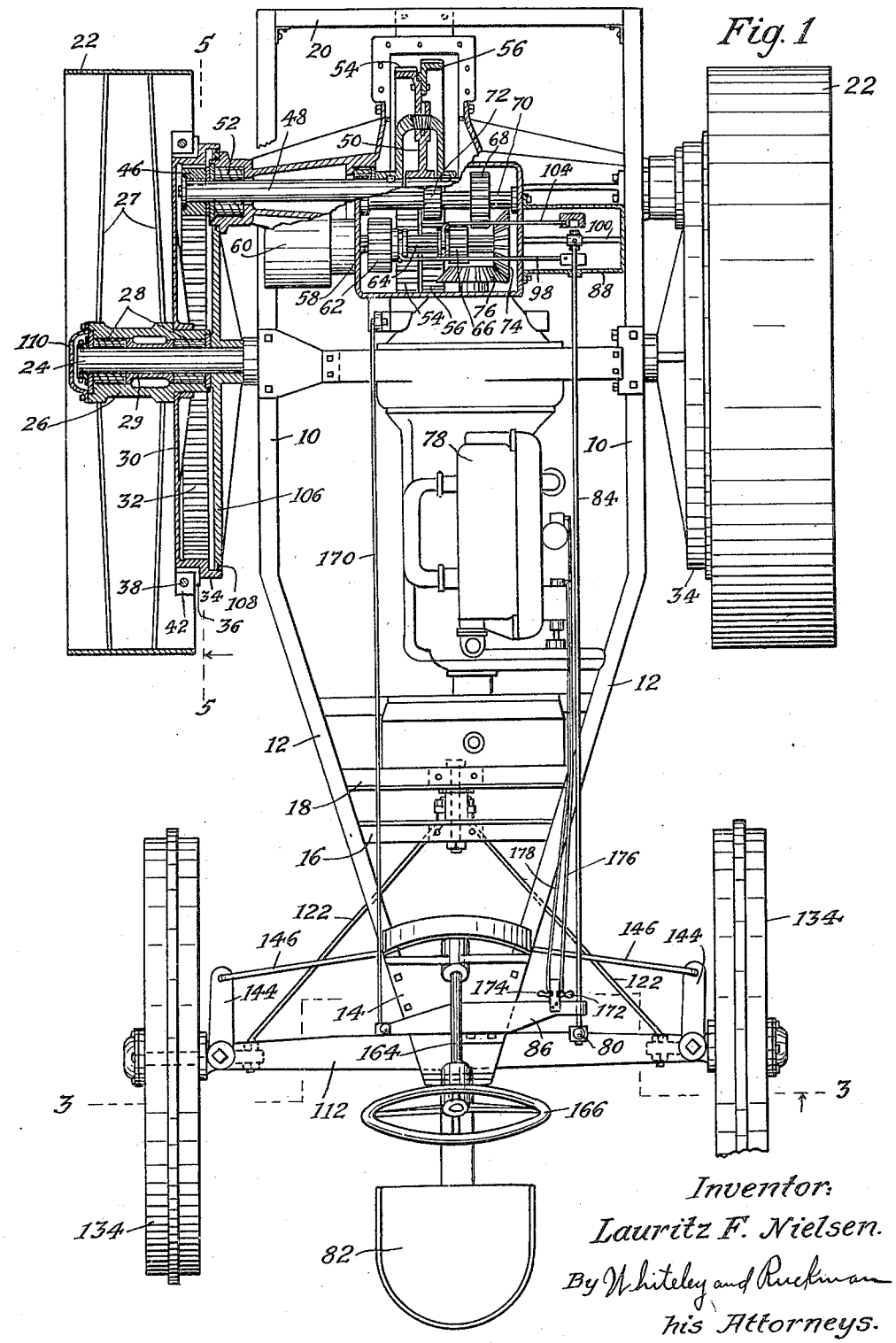
Figure 2:
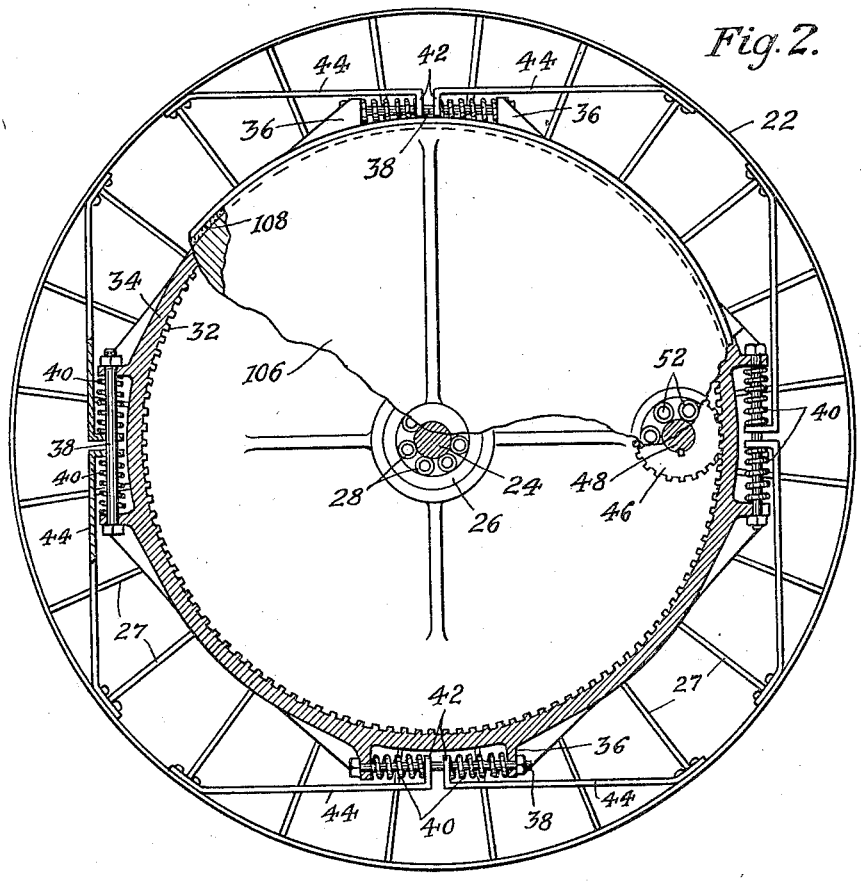

Figure 1 is a top plan view with certain of the parts in section. Fig. 2 is a section on line 5—5 of Fig. 1.

In carrying out my invention I provide a frame consisting of two longitudinal beams having front parallel portions 10 and rear portions 12 which converge so as to approach each other at their rear ends where they are secured together by a bracket 14. The longitudinal members are secured together by the intermediate transverse members 16 and 18 and a front transverse member 20. The frame is supported at its front by two driving wheels rotatably mounted on a stationary shaft 24 which is secured to the members 10 of the frame. The rims 22 of the driving wheels are connected to hubs 26 by spokes 27, and the hubs are provided with roller bearings 28 separated by spacers 29 and upon the inner ends of the hubs are mounted cup-shaped members 30 capable of turning movement on the hubs for a purpose now to be described. Within the cup-shaped members are internal gears 32 upon the inner surface of their rim portions 34. The rim portions 34 are provided on their outer surface with four pairs of lugs 36, and between the pairs of lugs extend bolts 38 as best shown in Fig. 2. Pairs of coiled springs 40 are placed on the bolts 38, the springs of each pair being spaced apart at their inner ends to receive between them inturned lugs 42 provided with holes by which they are slidably mounted on the bolts 38. The lugs 42 are carried by rods or bars 44 which at their outer ends are secured to the rims 22 of the driving wheels which are by the means just described resiliently connected for driving operation from the internal gears 32 with which pinions 46 are in mesh. The pinions 46 are secured on the outer ends of differential shafts 48 operated by customary or preferred differential mechanism 50. The shafts 48 are provided with roller bearings 52 by which they are rotatably supported in the transmission casing. The differential mechanism includes the driving gears 54 and 56, the gear 56 being larger than gear 54. A shaft 58 mounted in the transmission casing has secured to one end thereof a belt pulley 60, while two gears 62 and 66 are slidably mounted on this shaft by a spline 64 so that the gear 62 may be meshed with the gear 54 for fast speed, the gear 66 may be meshed with the gear 56 for slow speed, and the gear 66 may be meshed with a gear 68 for reversing the direction of travel of the tractor. The gear 68 is secured to a countershaft 70 upon which is also secured a gear 72 meshing with the gear 56. A beveled gear 74 secured to the shaft 58 meshes with a beveled gear 76 which is secured to the front end of the engine shaft of the engine 78, which may be any suitable type of internal combustion engine. The gears are shifted by the following mechanism. A handle 80 within reach of the operator on the seat 82 at the rear of the tractor is secured to the rear end of a rod 84 suitably mounted in a bracket 86 and in a housing or shifter box 88 for both racking and sliding movement. The rod 84 serves to operate the forked rod 98 to slide the gear 62, and also serves to operate the forked rod 104 to slide the gear 66. Liability of injuring the gears is decreased by relieving the strain on the gears when the tractor is started either in forward or backward direction on account of the resiliency of the springs 40. The provision of these springs decreases the various shocks and strains incident to shifting the gears and starting the tractor. In order to prevent wear on the gears 32 and 46 due to the presence of grit and dirt, the cup-shaped member 30 within which these gears are located is provided with a cover 106 which fits within the rim portion 34. The periphery of the cover is provided with a groove in which is placed a packing 108 which insures a tight joint and makes the casing dust-proof. The outer end of the hub 26 is provided with the customary cap 110 to prevent entrance of dirt at this place.

The operation and advantages of my invention will be readily understood from the foregoing description. On account of the yielding connections for operating the driving wheels, shocks and jerking are to a large extent eliminated and the arrangement of gear-shifting mechanism also decreases liability of jerking and injury to the gears. The inclosure of the gears for operating the driving wheels in a dust-proof casing decreases the wear on these gears.

I claim:

1. In a tractor the combination of a stationary shaft, driving wheels rotatably mounted on said shaft, cup shaped members mounted for yielding movement on the hubs of said driving wheels, pairs of lugs on the outside of said cup-shaped members, cushioning means between said pairs of lugs, pairs of rigid members attached at their outer ends to the rims of said driving wheels and yieldingly connected at their inner ends through said cushioning means with said cup shaped members, and means for driving said cup shaped members.

2. In a tractor the combination of a stationary shaft, driving wheels rotatably mounted on said shaft, cup shaped members mounted for yielding movement on the hubs of said driving wheels, pairs of lugs on the outside of said cup-shaped members, bolts connecting said pairs of lugs, pairs of rigid members attached at their outer ends to the rims of said driving wheels and slidably mounted at their inner ends upon said bolts, pairs of springs interposed between said last mentioned ends and said lugs, and means for driving said cup shaped members.

3. In a tractor the combination of a stationary shaft, driving wheels rotatably mounted on said shaft, cup-shaped members mounted for yielding movement on the hubs of said driving wheels, internal gears formed within the margins of said cup shaped members, pairs of lugs on the outside of said cup-shaped members, bolts connecting said pairs of lugs, pairs of rigid members attached at their outer ends to the rims of said driving wheels and slidably mounted at their inner ends upon said bolts, pairs of springs interposed between said last mentioned ends and said lugs, pinions meshing with said internal gears, and means for driving said pinions.

4. In a tractor the combination of a shaft, driving wheels rotatably mounted on said shaft, cup-shaped members mounted for yielding movement on the hubs of said driving wheels, internal gears formed within the margins of said cup-shaped members, pairs of lugs on the outside of said cup-shaped members, bolts connecting said pairs of lugs, pairs of rods attached at their outer ends to the rims of said driving wheels and having angular inner ends slidably mounted upon said bolts, pairs of springs interposed between said last mentioned ends and said lugs, pinions meshing with said internal gears, and means for driving said pinions.

5. In a tractor the combination of a stationary shaft, driving wheels rotatably mounted on said shaft, cup shaped members mounted for yielding movement on the hubs of said driving wheels, internal gears formed within the margins of said cup shaped members, covers fitting the margins of said cup-shaped members, said covers having recesses in their peripheries, packing in said recesses, pairs of lugs on the outside of said cup-shaped members, bolts connecting said pairs of lugs, pairs of rods attached at their outer ends to the rims of said driving wheels and having angular inner ends slidably mounted upon said bolts, pairs of springs interposed between said last mentioned ends and said lugs, pinions meshing with said internal gears, and means for driving said pinions.

In testimony whereof I hereunto affix my signature.

LAURITZ F. NIELSEN.